(12) United States Patent
Gillai et al.

(10) Patent No.: US 8,346,875 B2
(45) Date of Patent: Jan. 1, 2013

(54) INTELLIGENCE OF THE CROWD ELECTRONIC MAIL MANAGEMENT SYSTEM

(76) Inventors: Saar Gillai, Dallas, TX (US); Jonathan Davar, Los Altos, CA (US); Tanuj Mohan, Los Altos, CA (US)

( * ) Notice: Subject to any disclaimer, the term of this patent is extended or adjusted under 35 U.S.C. 154(b) by 0 days.

(21) Appl. No.: 12/286,954

(22) Filed: Oct. 3, 2008

(65) Prior Publication Data

US 2009/0094340 A1    Apr. 9, 2009

Related U.S. Application Data (60) Provisional application No. 60/998,011, filed on Oct. 5, 2007.

(51) Int. Cl.
*G06F 15/16* (2006.01)
(52) U.S. Cl. .............................. 709/206; 709/207
(58) Field of Classification Search ............. 709/206
See application file for complete search history.

(56) References Cited

U.S. PATENT DOCUMENTS

| | | | | |
|---|---|---|---|---|
| 6,072,942 A * | 6/2000 | Stockwell et al. | ........... | 709/206 |
| 6,161,130 A * | 12/2000 | Horvitz et al. | ........... | 709/206 |
| 6,421,709 B1 * | 7/2002 | McCormick et al. | ........ | 709/206 |
| 7,007,067 B1 * | 2/2006 | Azvine et al. | ............ | 709/206 |
| 7,890,642 B2 * | 2/2011 | Jones et al. | ............... | 709/229 |
| 7,933,961 B2 * | 4/2011 | Mandel et al. | ............ | 709/206 |
| 7,970,901 B2 * | 6/2011 | Lipscomb et al. | .......... | 709/225 |
| 8,046,832 B2 * | 10/2011 | Goodman et al. | ........... | 726/23 |
| 2003/0195937 A1 * | 10/2003 | Kircher et al. | ............ | 709/207 |
| 2004/0019651 A1 * | 1/2004 | Andaker | .................. | 709/207 |
| 2005/0203929 A1 * | 9/2005 | Hazarika et al. | ........... | 707/100 |
| 2006/0026236 A1 * | 2/2006 | Scian et al. | ............... | 709/206 |
| 2006/0083358 A1 * | 4/2006 | Fong et al. | ............... | 379/88.13 |
| 2006/0085504 A1 * | 4/2006 | Yang et al. | ................ | 709/206 |
| 2006/0195533 A1 * | 8/2006 | Isozaki et al. | .............. | 709/206 |
| 2007/0005762 A1 * | 1/2007 | Knox et al. | ................ | 709/224 |
| 2007/0083528 A1 * | 4/2007 | Matthews et al. | ............ | 707/10 |
| 2007/0100949 A1 * | 5/2007 | Hulten et al. | ............... | 709/206 |
| 2007/0156886 A1 * | 7/2007 | Srivastava | ................. | 709/224 |
| 2007/0208853 A1 * | 9/2007 | Yang | ........................... | 709/225 |
| 2008/0065736 A1 * | 3/2008 | Gross | .......................... | 709/207 |
| 2008/0133672 A1 * | 6/2008 | Gillum | ........................ | 709/206 |
| 2008/0162640 A1 * | 7/2008 | Boss et al. | ................. | 709/206 |

* cited by examiner

*Primary Examiner* — Djenane Bayard
*Assistant Examiner* — Umar Cheema
(74) *Attorney, Agent, or Firm* — Brian R. Short (57) ABSTRACT

Embodiments of ranking emails within an email system are disclosed. One method of ranking emails within an email system includes monitoring actions of a plurality of email users of the email system, and ranking a plurality of emails sent or received by at least one of the email users based on the monitored actions of the plurality of email users.

21 Claims, 5 Drawing Sheets

FIGURE 5

INTELLIGENCE OF THE CROWD ELECTRONIC MAIL MANAGEMENT SYSTEM

RELATED APPLICATION

This patent application claims priority to provisional patent application Ser. No. 60/998,011, filing Oct. 5, 2007, and is incorporated by reference.

FIELD OF THE INVENTION

This invention is concerned with the area of electronic mail systems, and more particularly with providing intelligence to electronic mail systems base on actions of users of the electronic mail system.

BACKGROUND

Existing approaches to email are rooted in the send-reply-forward paradigm, and rely on an explicit mechanism rather than an intelligent ranking scheme. OUTLOOK (®), for example, allows the sender to set a message's importance and sensitivity; recipients can flag messages. However, current systems lack a dynamic collaboration mechanism; messages are simply sent, replied to and forwarded. There is no notion or presentation of group importance, no dynamic mechanisms that prioritize, manage or reflect the evolution of a thread.

There is a need for a method and apparatus for electronic mail management that prioritizes electronic mails based at least in part on actions of the senders and/or recipients of the electronic mails.

SUMMARY

An embodiment includes a method of ranking emails within an email system. The method includes monitoring actions of a plurality of email users of the email system, and ranking a plurality of emails sent or received by at least one of the email users based on the monitored actions of the plurality of email users.

Another embodiment includes an email management program for operating an email system. The program is operable on one or more servers, and when executed, monitors actions of a plurality of email users of the email system, and ranks a plurality of emails sent or received by at least one of the email users based on the monitored actions of the plurality of email users.

Another embodiment includes an email system. The email system comprises means for monitoring actions of a plurality of email users of the email system, and means for ranking a plurality of emails sent or received by at least one of the email users based on the monitored actions of the plurality of email users.

DESCRIPTION OF EMBODIMENTS

The described embodiments provide methods for automated collaborative prioritization (ranking) of email messages based on the plurality of relationships and/or dynamic actions of the recipients of an email. One method includes an intelligent email management system (IEMS) that manages the dynamic relative priorities of each user's email threads through a scoring mechanism. For this embodiment, the IEMS includes a ranking engine and/or a collaboration engine.

The following described embodiments provide for the management of electronic mail and email. It is to be understood the electronic mail can include email, voice mail, facsimile (fax) mail, or any other form of electronic mail. The descriptions provided for email, for example, are equally applicable to each of these different types of electronic mail. For example, voice mail can be ranked by a voice mail management system that ranks the voice mail based upon action of senders and/or receivers of the voice mails. Additionally or alternatively, one type of electronic mail (such as voice mail) can influence the ranking of a different type of electronic mail (such as email).

An embodiment of the IEMS maintains a Bayesian filter database for the IEMS to determine ranking probability scores for prior emails patterns, based on subject and content keywords, sender-recipient patterns and prior system and user ranking scores. The filter is used to assign an importance weighting to the scoring of each email.

Figure 1:
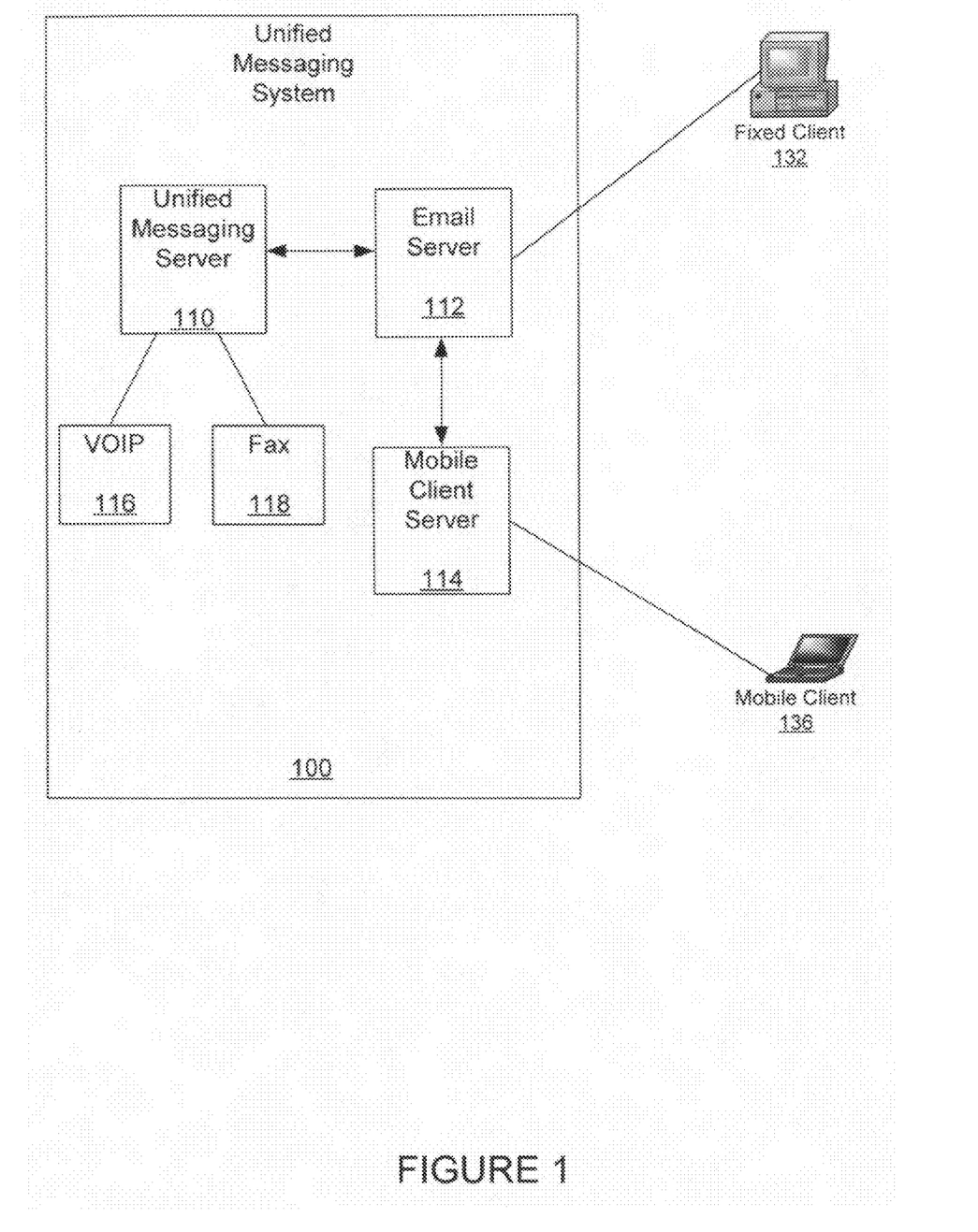
FIG. 1 shows an example of an Email System in a Unified Messaging System that includes an email server that embodiments of an intelligent email management system are operable.

FIG. 1 shows an example of an Email System in a Unified Messaging System 100 that includes an email server 112 that embodiments of an intelligent email management system are operable. Embodiments of email server 112 are operable within the unified messaging system 100. Embodiments of the unified messaging system additionally include a unified messaging server 110 and a mobile client server 114. The electronic mail can include email, voice mail, fax mail or an other type of electronic mail, received, for example, from a voice over IP (VOIP) device 116 or a fax device 118.

An Exemplary IEMS Architecture

Figure 2:
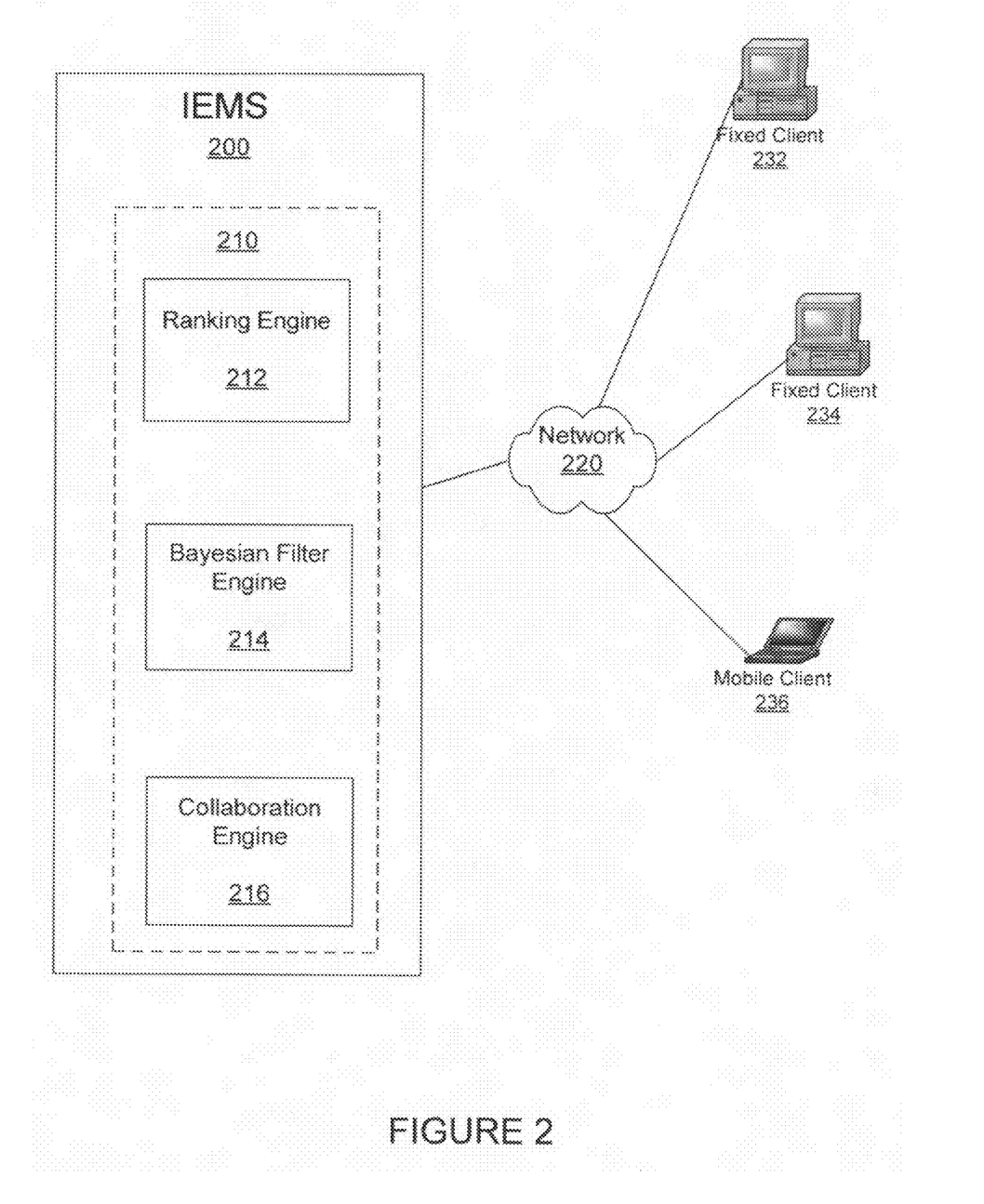
FIG. 2 shows a diagram of one embodiment of an IEMS.

FIG. 2 shows a diagram of one embodiment of an IEMS 200. As shown, the IEMS 200 includes a centralized IEMS server 210. The IEMS server 210 includes an email ranking engine 212 that ranks electronic mails, a Bayesian filter engine 214 and a collaboration engine 216 that monitors electronic client actions. Electronic mail applications (and users) can use IEMS extensions to interface with a collaboration engine 216 of the IEMS server 210. The collaboration engine 216 can include, for example, an integrated local IEMS client, or a web client plug-in.

The ranking engine 212 performs IEMS ranking operations and can interface with the collaboration engine 216. The collaboration engine 216 maintains a database of prior collaboration. The Bayesian filter engine 214 manages all content patterns and maintains a content pattern database. The Bayesian filter engine 214 processes all electronic mail content, including subject and content, which is used by the collaboration engine to track content patterns between users. Embodiments of the collaboration engine 216 monitor all actions and interactions between electronic mail clients 232, 234, 236 (and users), and interfaces with the Bayesian filter engine 214 to further monitor content interactions between users 232, 234, 236.

Embodiments of the IEMS include email rankings that are implicit or inferred, based on a variety of independent mechanisms including the relationship between the sender of emails and the receiver or the emails, the collective actions of the recipients, the responsiveness of each recipient, and/or the application of Bayesian probabilities, filters, and/or patterns of previous email threads to the current one. The email rankings can additionally or alternatively be explicit, based on ranking actions performed by the sender or any recipient.

The benefits provided by the email ranking embodiments described are particularly useful for email exchanges between many email users. However, the embodiments can also be useful for even two users by prioritizing and consolidating their (the two email users) email exchanges.

An embodiment of the IEMS combines all emails in a thread into a single email, referred to as a composite email. This composite email allows a user to view all of the threads or composite emails in the inbox. Since the ranking of threads changes dynamically, the IEMS can provide an alternative chronological view of threads, ordered by the last message received, as opposed to a ranked view.

Generally, an email creates an email thread that includes interactions between two or more email users. An embodiment of the IEMS includes generating two ranking scores for each email thread. A first ranking includes a system score that determines that thread's importance relative to all other threads in the entire IEMS. A second ranking includes a user score that determines that thread's importance to the user. In both cases, scoring is applied to each message based on the relationship between sender and recipient.

An embodiment of the IEMS maintains a relationship score/weighting for each active sender-receiver pair in the system; the scores are asymmetrical and determined by the actions and responsiveness of the receiver to emails from the sender, and optionally influenced by learned or configured relationships. For example, email from a manager to his subordinates typically ranks higher than an email from a subordinate to the manager.

An embodiment of the IEMS tracks responsiveness of email users. The responsiveness can be measured by time and/or actions, for each sender-recipient pair. Per user responsiveness can be measured and normalized for the user's typical behavior with respect to ranked (system and Bayesian) emails from that sender. Outliers to the normalized behavior of the user can be excluded. By normalizing per user, the email system can be trained to learn the behavior of a broad set of email users. For example, the email system can learn the behavior of users who actively monitor email, PDA users, and users who check email intermittently. By monitoring each sender-recipient pair, the system can characterize the importance of each sender for a particular recipient, and can determine relative ranking between senders. For each sender, the system can track the actions of the recipient, including how frequently the recipient responds, forwards, deletes, the speed of response, the time to compose a response, etc. Based on the tracked actions, the email system can rank emails in order of perceived importance.

When the initial email is sent, the IEMS can use the relationship and importance weighting to determine both system and user scores. The sender can also explicitly rank the email, choosing, for example, one of the following: informational, low, normal, high, critical. For an embodiment, the explicit ranking can override or at least influence the implicit ranking. An implicit ranking is a ranking that is system generated rather than user generated. These weightings combine to raise or lower the score/ranking and thereby the priority (ranking) of the initial email. The IEMS scores emails with a probability of important content high; emails from a sender that the user often responds to can also receive a higher score. For example, an email with the pattern "server crash unrecoverable" receives a high ranking, and one that combines this pattern with the name of a key customer receives an even higher ranking. If these emails are coming from a tier 3 support person that the recipient always responds to immediately, the email is ranked high based on prior responsiveness.

The email ranking scores (both system and/or user) typically change as recipients receive and act on the initial email. Each user's responsiveness is compared to his typical responsiveness to prior emails from this sender and used to modify the scores for the email or email thread. Each subsequent response by other senders to the initial email or subsequent responses in the email thread can further modify the scores. The score can be tied to the initial email, the response to the email and/or a combination. For one embodiment, the score is tied to the thread (and its composite email), because the content can change with each response. In the previous example of "server crash unrecoverable", a subsequent email with additional content "customer escalating" will increase the thread ranking. As the thread ages, its score can change dynamically based on the most recent actions of the recipients. For an embodiment, at some point, the thread becomes stale due to inactivity (reflected in responsiveness), which can be reflected in the score.

An embodiment of the scoring algorithm calculates a weighted score for each email based on the sender-receiver relationships, Bayesian filters and/or email actions. For an embodiment, the scoring range is from 1 to 100. Initial email scoring, as described above, is determined by the relationship and Bayesian scores. Content and sender-recipient patterns determine the score based on prior patterns, with important emails scoring, for example, above 70, but less than 90, and unimportant emails scoring, for example, below 40. Normal emails can fall in the range of 40 to 70. Subsequent actions raise or lower the score.

When a receiver receives a message, the IEMS calculates a revised system and per user score based on the existing thread score (before the latest action) and the action score of the last sender. An exemplary scoring algorithm calculates a per message score for recipient i per user z based on, for example, the following formula:

$$\text{message } y \text{ score for user } z = \sum_{i=1}^{\text{number of recipients for message } y} \text{recipient } i(\text{weight score} \times \text{action score} \times \text{thread weight})$$

Where:

The Weight score=The weighted score of recipient i for user Z, determined by the current, cumulative sender-receiver score.

The Thread weight=The scoring mechanism applies greater weight to active threads. These are threads with a higher percentage of responders (averaged by num of recipients) and to the order in which threads are responded to/acted upon.

The Action score=The score of the action taken by the sender (delete, forward, respond, file etc). This score includes the amount of absolute and relative time spent reviewing this email; outlier times (when the user is away from the email system) are not considered.

Embodiments can include scoring and ranking of emails being averaged by number of recipients. It is to be understood that a recipient is one of multiple users who receives email. Otherwise, emails with a large number of recipients can be scored abnormally higher. Other embodiments include the identification of key relationships between the receiver and the sender and/or recipients, based on email patterns and content. These relationships include peer, subordinate and management relationships. The IEMS can infer peer relationships when users have the same manager. The relationships can be reflected through weighting.

After the recipient receives and processes a message, the score is updated and reflected throughout the IEMS. So the score for message y (for user z) reflects the averaged sum of scores for actions that any other recipients (weighed by sender-receiver) have performed on each subsequent message. As more actions are taken, scores (and ranks) can change dynamically.

For an embodiment, the system score is the weighted average of the active recipient scores in the thread and measures importance for all users in the system. The visibility can be limited to those threads in which the user is a participant. The use of both system and user score provides the user visibility of important threads in a collaborative work-environment, in addition to identifying those that are important to the user.

Action scores are affected by how the user handles email. An embodiment includes the IEMS being aware of when the user activates the IEMS client, and what the user subsequently does, including how user reads the email relative to time of arrival and also relative to other email in the user's inbox. Embodiments of the IEMS monitor how much time a user spends reading the email, both in absolute and relative terms (per users' typical time), and what operations or actions are performed on the email, including responses, whether it is deleted or forwarded, how and where it is filed, whether a specific deliverable is requested and if the deliverable has been successfully and satisfactorily accomplished. Actions can include, but are not limited to, forwarding, replying, deleting, assigning, deferring and resolving.

Important emails can, for example, include required action and resolution. An embodiment allows each user to attach, for example, a deliverable/action to be resolved thread to a composite email thread. The deliverable and action to be resolved can be assigned an owner (for example, one of the users) and a date. Embodiments include the deliverable and action to be resolved influencing the user and/or system rankings. For example, as a date gets closer, the ranking of the email can be influenced (typically increased). If a deliverable has been delivered, or a date has expired, an email can be correspondingly re-ranked (typically lowered in rank).

Ranking can also be applied to electronic mail systems like voicemail or fax, and rank by content in these electronic mails. The ranking of one electronic mail system can also be affected by different electronic mail formats. For example, a voicemail from an irate customer may increase the ranking of an email thread from or about this customer. In another example, receipt of a fax may increase the ranking of a voicemail where the content includes the pattern "will send a fax today".

For an embodiment, the ranking of a thread with deliverables increases as the deliverable date approaches. For an embodiment, the score and ranking of a thread decreases as more recipients delete the thread.

An embodiment of the IEMS supports an explicit mechanism to reduce the score of the thread relative to others. For example, an embodiment allows a user to mark an email thread as resolved and thereby de-prioritize it. The email thread can be reprioritized if needed by a user marking it as unresolved, or by subsequent prioritizing activity within the thread.

Embodiments of the IEMS continuously learns the participants involved in email threads on specific topics, and can identify when a thread does not include users who should have visibility. For an embodiment, the IEMS notifies email thread participants that these users have not been included, and allows any current participant to easily add them to the email thread.

An embodiment of the IEMS includes automated handling of email threads that system or users rate as unimportant. Rules can be configured, or by default, to handle email threads below a certain threshold, including the marking of these email threads as unimportant, putting them into a low priority view, moving the email threads into folders, deleting them, etc.

Other methods for prioritization (ranking) can include management and presentation based on ranking of emails at an email client, including the management of consolidated emails; this is the consolidation of all emails in a thread into a single email. At an email client, rather than display multiple separate emails sorted by conversation, subject (OUTLOOK®) or chronologically, or as a list of emails (GMAIL®), the IEMS, unifies all the emails into a single, composite email. This is especially practical for users of mobile clients or PDAs, who can see a concise, ranked view of emails above a certain ranking. Instead of replacing the current structure and methods of presentation, the IEMS will offer additional views and folders, for example separate composite and prioritized views or folders, allowing the user to switch between views. For ease of use, icons can provide one-click access to each view.

Regardless of the choice of views or folder organizations, actions taken on a composite email can affect all of the emails in the thread. For example, deleting the composite email can remove it and all of the emails that make up the thread. Typically, performing such an action removes the emails from all folders and therefore all views. Optionally, the user can chose to manage his composite and priority views and folders separately.

Another embodiment of the IEMS includes the ability to annotate the thread. This allows users to treat the thread as a living document, and annotate or comment at any part of the thread or composite email. The comments or annotations may influence the ranking. One embodiment includes annotations being local additions that affect the user's ranking.

For embodiments, the IEMS can synchronize the system-wide thread priorities with each email client. The email client presents a prioritized view of these threads to the user by allowing the user to sort his inbox by collaborative ranking, or alternately through a priority toolbar that orders threads by ranking. An embodiment of the IEMS client also embeds icons and widgets into each email, including widgets that display system ranking, that rank, single-click rank and close, thread state (ranking, requests for action, resolution and closure), etc. These widgets represent the complete and current state of the thread, and permit all explicit controls, available through widgets or buttons on the email. These include the system ranking, the users own ranking, user actions and any annotations made to the thread.

Figure 3:
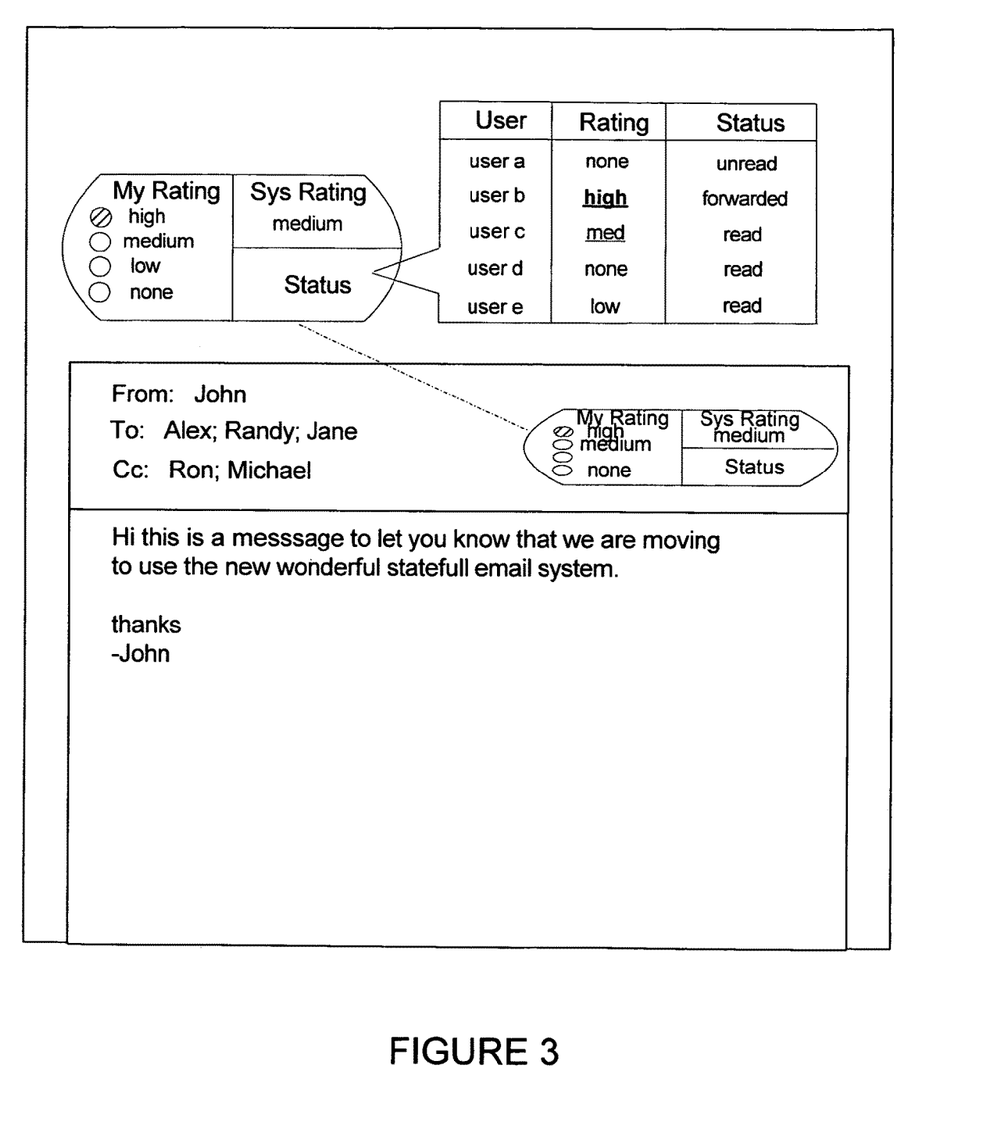
FIG. 3 shows an example of an email that shows user and system rankings and monitored actions of the electronic mail users.

As illustrated in FIG. 3, the client embeds a widget in each email that shows the current ranking and with a mouse-over pops up the thread status. Additionally, FIG. 3 shows an explicit ranking widget for an email, allowing the user to raise or lower the user ranking. One embodiment of an IEMS client includes a toolbar with navigation to ranked emails, hot threads for the day, threads with deliverables, resolved threads, etc.

Figure 4:
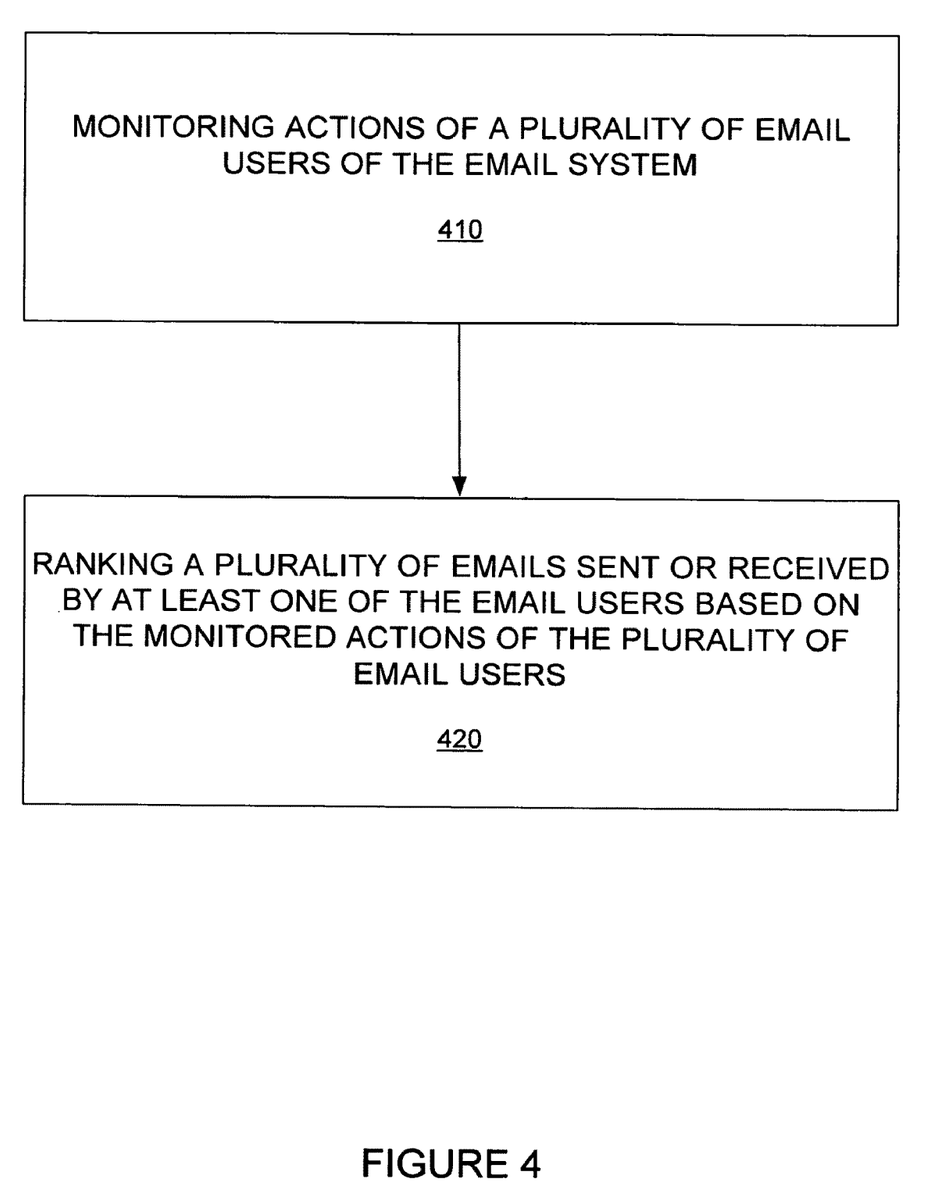
FIG. 4 is a flow chart showing steps of one example of a method of ranking emails within an email system.
Figure 5:
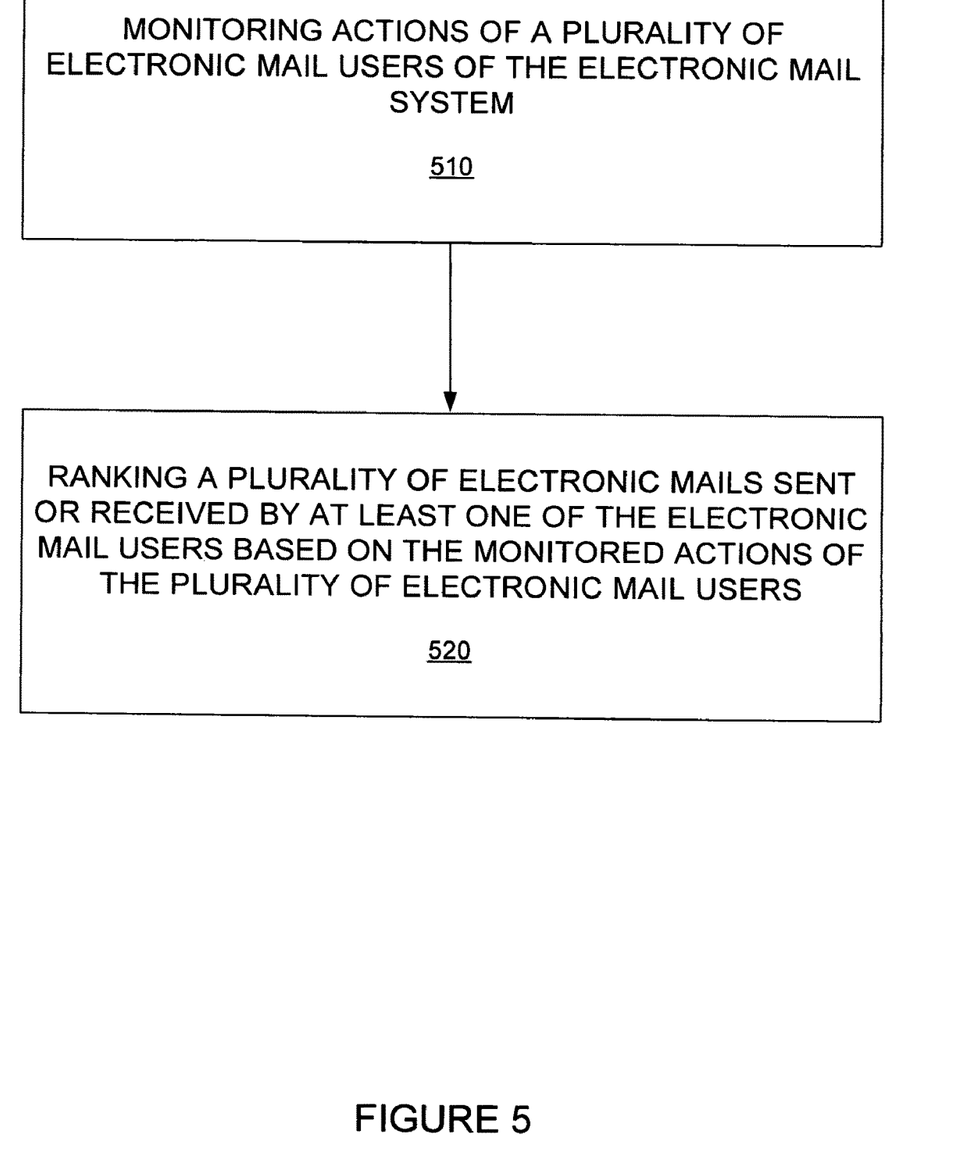
FIG. 5 is a flow chart showing steps of one example of a method of ranking electronic mails within an electronic mail system.

FIG. 4 is a flow chart showing steps of an example of a method of ranking emails within an email system. A first step 410 includes monitoring actions of a plurality of email users of the email system. A second step 420 includes ranking a plurality of emails sent or received by at least one of the email users based on the monitored actions of the plurality of email users.

Many different actions of the email users can influence the rankings of the emails. Generally, the ranking are set by a level of perceived importance of each email as determined by the actions of at least one of the plurality of email users. For example, the monitored actions can include timing how long it takes for at least a subset of the plurality of email users to access (that is, for example, to open and read the email) each one of the ranked emails. This can be, for example, the time taken be use email user to read and/or respond to an email. The rankings can be influenced by the time take for an email relative to the time take for other emails.

For an embodiment, the monitored actions additionally or alternatively include counting how many times at least a subset of the plurality of email users accesses (for example, opens and reads and/or acts on) each one of the ranked emails. The rankings can be influenced by the number of times an email is accessed relative to the number of times other emails are accessed.

For an embodiment, the monitored actions additionally or alternatively include timing how long at least a subset of the plurality of email users spend reviewing each one of the ranked emails.

For an embodiment, the monitored actions additionally or alternatively include counting how many of at least a subset of the plurality of email users respond to each one of the ranked emails.

For an embodiment, the monitored actions additionally or alternatively include counting how many times at least a subset of the plurality of email users respond to each one of the ranked emails.

For an embodiment, the monitored actions additionally or alternatively include evaluating at least one email user forwarding at least one of the ranked emails. More specifically, this can include evaluating who the at least one email is forwarded to, and influencing the ranking based on who the at least one email is forwarded to. For an embodiment, past interaction between the email users determines how much the ranking is influenced by who receives the at least one forwarded email. The ranking can influence by relationships between, for example, senders and receivers of the emails, relationship scores, content and/or subject keywords and/or recipient rankings, and all recipients and keywords.

For embodiments, the email users of the email system influence the rankings. For example, the email users can influence how much the ranking is influenced by who receives the at least one forwarded email. Additionally, or alternatively, at least one email user explicitly influencing the ranking.

An embodiment includes the ranking being additionally influenced by content of at least one of the emails. The content can be, but is not limited to, keywords, combinations of key words, or phrases within the emails. A rank of one email can be influenced by content of another email. A ranking of an email or a voice mail can be influenced by content of another email and/or voice mail. An embodiment includes the content of, for example, an email thread being dynamically updated by email users, and the updated content adaptively reflected in an updated ranking of the email thread.

Email users can dynamically updating a content of at least one of the emails. The dynamic updates can include influence rankings based on the content. The emails can be presented to the email users such that the rankings can be easily conveyed to the email users.

The relationships between the email users can influence the rankings. That is, the email system can explicitly or implicitly establish relationships between email users, and influence the rankings based on monitored actions between email users having established relationships.

Embodiments include the ranking of the plurality of emails being based on the monitored actions being updated every predetermined amount of time. Additionally, the monitored actions can time-out after the predetermined period of time.

For an embodiment, the email management system includes a personal ranking for at least one of the email users, and a system ranking including at least a plurality of email users.

For embodiments, email sender and receiver patterns are tracked, and used to influence at least a personal ranking of the emails based on established patterns between the email senders and the email receivers.

When generated, the emails can include a pre-ranking. That is, the email can include an initial rank even though no actions associated with the email have yet been monitored. For an embodiment, the pre-ranking is based on recipients of the at least one email.

An embodiment includes emails having a rank above a threshold being designated as most important. Actions performed on emails ranked that highest can include, for example, the email being flagged, sorted for collaboration, presented for collaboration. Additionally, emails designated as most important can be treated differently. For example, only emails that are designated as most important can be forwarded to mobile users, thereby reducing the email overhead of the mobile user.

An embodiment includes emails having a rank below a threshold being designated as least important. Actions performed on the least important emails can include, for example, the emails being sorted for collaboration, moved to folder, marked (unimportant, resolved)

Although specific embodiments have been described and illustrated, the embodiments are not to be limited to the specific forms or arrangements of parts so described and illustrated.

What is claimed:

1. A method of ranking emails within an email system, comprising:

an email server monitoring actions of a plurality of email users of the email system, including monitoring actions of a plurality of recipients of each of a plurality of emails; and the email server ranking each email of the plurality of emails based on the monitored actions of the plurality of recipients of the email;

wherein for each email the email server creates an email thread that includes interactions between two or more of the plurality of email users;

wherein the email server ranking generates at least two ranking scores for each email thread, a first ranking includes a system score that determines an importance of the email thread relative to all other email threads in the email server, a second ranking that includes a user score that determines an importance of the email thread to a particular user, wherein the system score and the user score is applied to each email thread based on a relationship between sender and the plurality of recipients of the email thread;

wherein the system score and the user score of each email thread dynamically increases or decreases as the plurality of recipients receive and act on the email thread;

wherein each subsequent response by other senders to subsequent responses in the email thread further modifies the system score and the user score;

wherein in each user is allowed to attach a deliverable action to each email thread; and wherein the system score and the user score of each email thread having a deliverable action increases as a deliverable date approaches.

2. The method of claim 1, wherein the monitored actions includes timing how long it takes for the plurality of recipients of the email to access the email.

3. The method of claim 1, wherein the monitored actions includes counting how many times the plurality of recipients of the email access the email.

4. The method of claim 1, wherein the monitored actions includes timing how long each of the plurality of recipients of the email spend reviewing the email.

5. The method of claim 1, wherein the monitored actions includes counting how many of the plurality of recipients of the email respond to the email.

6. The method of claim 1, wherein the monitored actions includes counting how many times the plurality of recipients of the email respond the email.

7. The method of claim 1, wherein the monitored actions include evaluating at least one email recipient user forwarding the email.

8. The method of claim 7, further comprising evaluating who the at least one email is forwarded to, and influencing the ranking based on who the email is forwarded to.

9. The method of claim 8, wherein past interaction between the email users determines how much the ranking is influenced by who receives the forwarded email.

10. The method of claim 8, wherein the amount of influence each email users has is dependent on who receives the forwarded email.

11. The method of claim 1, further comprising at least one email user influencing the ranking by performing ranking actions.

12. The method of claim 1, further comprising the ranking additionally being dependent on a content of the email.

13. The method of claim 12, further comprising the content being dynamically updated by the plurality of recipients of the email, and the ranking additionally being dependent on the updated content.

14. The method of claim 1, further comprising establishing relationships between email users, and influencing the rankings based on monitored actions between email users having established relationships.

15. The method of claim 1, further comprising ranking the email based on the monitored actions being updated every predetermined amount of time.

16. The method of claim 15, wherein the monitored actions time-out after the predetermined period of time.

17. The method of claim 1, further comprising tracking email sender and receiver patterns, and influencing at least a personal ranking of the email based on established patterns between at least one email sender and at least one email receiver.

18. The method of claim 1, further comprising pre-ranking at least one email.

19. The method of claim 18, wherein the pre-ranking is based on recipients of the at least one email.

20. A method of ranking electronic mails within an electronic mail system, wherein the electronic mails comprise at least one of email, voicemail and fax, comprising:

an email server monitoring actions of a plurality of electronic mail users of the electronic mail system, including monitoring actions of a plurality of recipients of each of a plurality of emails; and the email server ranking each email of the plurality of emails based on the monitored actions of the plurality of recipients of the email; wherein wherein for each email the email server creates an email thread that includes interactions between two or more of the plurality of email users;

wherein the email server ranking generates at least two ranking scores for each email thread, a first ranking includes a system score that determines an importance of the email thread relative to all other email threads in the email server, a second ranking that includes a user score that determines an importance of the email thread to a particular user, wherein system score and the user score is applied to each email thread based on a relationship between sender and the plurality of recipients of the email thread;

wherein the system score and the user score of each email thread dynamically increases or decreases as the plurality of recipients receive and act on the email thread;

wherein each subsequent response by other senders to subsequent responses in the email thread further modifies the system score and the user score;

wherein in each user is allowed to attach a deliverable action to each email thread; and wherein the system score and the user score of each email thread having a deliverable action increases as a deliverable date approaches.

21. Method of claim 20, wherein the ranking further comprises influencing ranking based on associating ranking between different types of electronic mails.

* * * * *